(12) United States Patent
Brot et al.

(10) Patent No.: US 8,979,036 B2
(45) Date of Patent: Mar. 17, 2015

(54) ELECTRICAL RUDDER CONTROL SYSTEM FOR AN AIRCRAFT

(75) Inventors: Patrice Brot, Ramonville-St-Agne (FR); Pierre Fabre, Tournefeuille (FR)

(73) Assignee: Airbus Operations SAS, Toulouse (FR)

( * ) Notice: Subject to any disclaimer, the term of this patent is extended or adjusted under 35 U.S.C. 154(b) by 277 days.

(21) Appl. No.: 13/616,744

(22) Filed: Sep. 14, 2012

(65) Prior Publication Data

US 2013/0075535 A1 Mar. 28, 2013

(30) Foreign Application Priority Data

Sep. 26, 2011 (FR) ...................................... 11 58550

(51) Int. Cl.
*B64C 13/08* (2006.01)
*B64C 13/50* (2006.01)
*G05D 1/00* (2006.01)

(52) U.S. Cl.
CPC ............... *B64C 13/503* (2013.01); *B64C 13/08* (2013.01); *G05D 1/0072* (2013.01)
USPC ........................... 244/220; 244/175; 244/235

(58) Field of Classification Search
USPC .......................... 244/175, 220, 221, 228, 235; 318/584–586
See application file for complete search history.

(56) References Cited

U.S. PATENT DOCUMENTS 5,657,949 A * 8/1997 Deck et al. .................. 244/76 A
6,000,662 A * 12/1999 Todeschi et al. ............. 244/223
6,526,338 B2 2/2003 Kubica
7,874,526 B2 * 1/2011 Boczar et al. ................ 244/235
2002/0022910 A1 2/2002 Kubica
2005/0021193 A1 * 1/2005 Raimbault et al. ............... 701/4
2011/0251739 A1 * 10/2011 Tomas et al. ...................... 701/3

FOREIGN PATENT DOCUMENTS

EP 0 742 141 11/1996
EP 1 160 158 12/2001

OTHER PUBLICATIONS

French Search Report dated Jul. 2, 2012.
Anonymous, "Airbus A320 Primary Flight Controls," DutchOps. com, XP-002678976, last updated May 28, 2010, <http://www. dutchops.com/Portfolio_Marcel/Articles/Flight%20Controls/ A320_Flight_Controls/A320_Primary_Flight_Controls.html >, as viewed by archive.org on Jun. 29, 2012 via <http://web.archive. org/web/20100528100551/http://www.dutchops.com/Portfolio_ Marcel/Articles/Flight%20Controls/A320_Flight_Controls/ A320_Primary_Flight_Controls.html>.

* cited by examiner

*Primary Examiner* — Troy Chambers
*Assistant Examiner* — Jamie S Stehle
(74) *Attorney, Agent, or Firm* — Dickinson Wright PLLC

(57) ABSTRACT

Disclosed is a vertical rudder control system for an aircraft. The system is comprised of a rudder trim compensation generator that is configured to generate a rudder trim compensation order to set the position of the rudder bar of the aircraft to a neutral position in which the rudder bar is controlled with nil (i.e., zero) pilot effort. The vertical rudder control system includes a flight control calculator for calculating rudder control orders to maintain the nil effort rudder bar position, with the calculation of the rudder control orders being based on a sum of the rudder bar position, determined by a detection unit, and the rudder trim compensation order. The rudder control orders are received by a rudder operating unit, which is used to deflect the vertical rudder by a deflection value based on the rudder control orders.

8 Claims, 1 Drawing Sheet

ELECTRICAL RUDDER CONTROL SYSTEM FOR AN AIRCRAFT

FIELD OF THE INVENTION

The present invention relates to a rudder control system for an aircraft, of an electrical type, with no mechanical rudder compensation.

BACKGROUND OF THE INVENTION

Each aircraft is provided with a flight command system connecting the piloting units (stick, rudder bar) with the aerodynamic control surfaces (ailerons, spoilers, vertical rudder, pitch motivator) of the aircraft. Those systems have been developed over the time with the technical progress from purely mechanical non-assisted systems to electrical (command) systems being hydraulically assisted.

On the first systems, the effort exerted by the pilot on the piloting units was integrally transmitted to the rudders and corresponded to the aerodynamic efforts. In order to minimize the muscular efforts, compensators or trims have been created to be able to vary the control surface position corresponding to a nil muscular effort from the pilot.

Over the technical evolutions, the trims have been essentially kept for operational needs (from the pilots). As on the present rudder control systems, there is no more mechanical connection between the rudder bar and the vertical rudder, the trim only serves to vary the nil effort position of the rudder bar.

Usually, a rudder control system for an aircraft, in particular for an airplane, of the electrical type, comprises:
- a rudder bar adapted to be operated by a pilot;
- means for detecting the position of the rudder bar and generating an electrical control signal being representative of such position; and
- a flight control calculator receiving such electrical control signal and generating, with the help of the latter, control orders being transmitted to actuating means for a vertical rudder of the aircraft.

The vertical rudder is so called electrical, since the order controlled by the pilot (position of the rudder bar) is transmitted to the flight control calculator under the shape of an electrical signal. The calculator uses then such pilot order to determine, thru internal control laws, the control order being effectively applied to the vertical rudder.

Despite such electrical characteristics, the rudder bar remains a complex mechanical unit. It especially comprises a spring assembly being able to create again an artificial sensation (as the rudder bar is not mechanically connected with the control surface of the aircraft anymore). Such artificial sensation generating means also comprise a mechanical rudder compensation or trim function. Such a function being implemented by a mechanical compensator or trim allows the pilot to control the nil effort rudder bar position. The control is carried out by the pilot thru buttons located in the cockpit.

Such mechanical rudder trim meets several operational needs:
- in the case of an engine failure.
  The failure of an engine of the aircraft generates a yawing moment. Thus, in order to keep an optimum flight line, the pilot must control a rudder bar order so that the vertical rudder generates a corrective yawing moment being opposed to the moment related to the engine failure.
  The constant application of such order obliges the pilot to exert a constant muscular effort on the rudder bar. In order to enable the pilot to release the pedals while keeping his position (and thus his order), he calls on the mechanical rudder trim function.
  The use of such function allows the nil effort position (initially supposed to be the neutral position) to be brought up to the current position of the rudder bar (required by the pilot). Thus, the pilot may release the rudder bar while keeping the current position; and
- in the case of an airplane being twisted or asymmetrically loaded (fuel, passengers).
  In those cases, the pilot can be in a position to ask for a constant slight rudder order so as to cancel or to compensate for the dissymmetry (optimum sideslip, minimum rudder clearance). To do so, the pilot may call on the mechanical rudder trim function. Thus, the rudder bar can take a non nil order without the pilot operates on the pedals (by a slight displacement of the nil effort point).

The presence, on an electrical rudder control system such as described above, of a mechanical rudder trim meeting the above mentioned needs, has some disadvantages, in particular in terms of mass, cost, installation, congestion, maintenance, overall reliability, etc.

SUMMARY OF THE INVENTION

The present invention aims at simplifying such electrical rudder control system and cancelling the mechanical compensation function. It relates to a rudder control system for an aircraft, of an electrical type, without any mechanical control trim which allows, despite the absence of a mechanical trim, to meet the operational needs related to such a trim.

With this end in view, according to the invention, said rudder control system of the type comprising:
- a rudder bar (pedals) being adapted to be actuated by a pilot of the aircraft;
- means for automatically detecting the position of the rudder bar and generating an electrical control signal being representative of such position; and
- calculation means receiving such electrical control signal and automatically generating, thru at least the latter, control orders which are transmitted to operating means for a vertical rudder of the aircraft, is remarkable in that it comprised additionally:
- auxiliary means for generating a rudder trim order under the shape of an auxiliary electrical signal so that the nil effort rudder bar position is the neutral position of the rudder bar; and
- means to transmit such auxiliary electrical signal to said calculation means being formed so as to generate, thru both this auxiliary electrical signal and said electrical control signal, the control orders which are transmitted to the operating means for the vertical rudder, said control orders being calculated from an overall order corresponding to the sum of the order relative to the rudder bar position represented by the electrical control signal and the compensation order represented by the auxiliary electrical signal generated by said auxiliary means so that the nil effort rudder bar position is always the neutral position of the rudder bar.

Consequently, thanks to the invention, the actions to meet the operational needs relative to a rudder trim are not implemented by a usual mechanical compensator, the rudder control system of which is absent, but by the generation and the application of a rudder trim order being transmitted (under the shape of an electrical signal) to the calculation means (or a flight control calculator) which use it to calculate the rudder control orders. The nil effort rudder bar position is thus always the neutral position of the rudder bar.

The cancelation on the rudder control system of the usual mechanical trim thus generates gains on the aircraft mass, costs, installation facility, maintenance operations and overall reliability.

In one first embodiment, said auxiliary means comprise automatic means for automatically determining, upon a failure of an engine of the aircraft, a compensation or trim order enabling a yawing moment generated by the engine failure to be compensated. Moreover, advantageously, said auxiliary means also comprise means for automatically detecting such a failure.

This first embodiment only applies in the case of an engine failure.

Moreover, in a second embodiment, instead of or in addition to said first embodiment, said auxiliary means also comprise hand operated means so as to allow the pilot to control (that is to say to select hand operation) a compensation order which is transmitted to the calculation means.

This second embodiment can be used in any situation of the aircraft requiring dissymmetry compensation, especially in the case of an aircraft being twisted or asymmetrically loaded (fuel, passengers).

Upon an engine failure, both embodiments can thus be used together or separately. In particular, the pilot can use the second embodiment to make a hand operated control in case of a failure of the automatic yawing moment compensation.

The hand operated means of said second embodiment can be realized on different ways.

Thus, in a first embodiment variation, said hand operated means comprise:
  a rotating button being adapted to be brought by hand into three different positions, namely:
    a first extreme position for which the value of the compensation order increases progressively;
    a second extreme position for which the value of the compensation order decreases progressively; and
    a neutral position for which the value of the compensation order is fixed; and
  a re-initialization button which resets the compensation order to a nil value when it is operated.

Moreover, in a second embodiment variation (preferred), said hand operated means comprise a (unique) control button which leads, when it is kept depressed and that simultaneously the rudder bar which was previously depressed is released (progressively), to a (progressive) increase of the compensation order, such increase being proportional to the clearance (release) variation of the rudder bar. The compensation order being generated corresponds to the one obtained at the moment of the release of said control button.

Furthermore, in a particular embodiment, said rudder control system comprises in addition means to automatically initialize, upon the disengagement of an automatic piloting system being previously engaged, the compensate value to the rudder control value controlled by such automatic piloting system before the disengagement thereof.

The present invention relates moreover an aircraft, in particular a transport airplane, which is provided with an electrical rudder control system with no mechanical rudder compensation such as the one above-mentioned.

BRIEF DESCRIPTION OF THE DRAWINGS

The FIGS. of the accompanying drawing will make well understood how the invention can be implemented. On those FIGS. identical annotations denote similar elements.

FIG. 1 is a block diagram of an electrical rudder control system according to the invention.

DETAILED DESCRIPTION OF THE INVENTION

Figure 2:
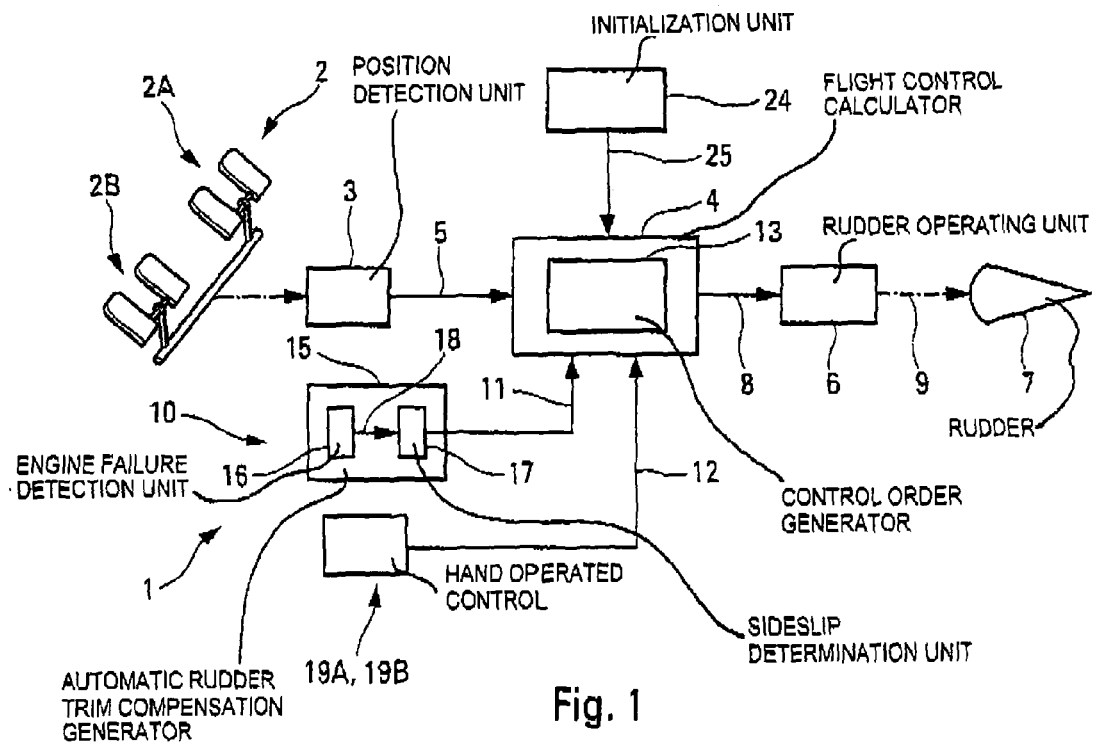
FIGS. 2 and 3 illustrate schematically different embodiments of hand operated control means for a rudder control compensation order making part of a system according to the invention.

The system 1 according to the invention and shown schematically on FIG. 1 is an electrical rudder control system for an aircraft (not shown), in particular an airplane and especially a transport airplane. Such system 1 has no mechanical rudder control compensator.

An electrical rudder control system 1 for an aircraft usually comprises:
  a rudder bar (realized under the shape of pedals) being adapted to be operated by the pilot (pedals 2A) or the copilot (pedals 2B);
  means 3 being associated with said rudder bar 2, determining its position and generating an electrical control signal being representative of such position;
  a flight control calculator 4 receiving such electrical control signal thru an electrical connection 5 and which generates, thru the latter, control orders; and
  operating means 6 for a vertical rudder 7 of the aircraft, to which this control orders are transmitted thru an electrical connection 8. These operating means 6 deflect the vertical rudder 7 (as illustrated by a link 9 in mixed lines) by a deflection value representative of the thus received control orders.

Such system 1 is so-called electrical, because the order controlled by the pilot (by operating the rudder bar 2) is transmitted to the flight control calculator 4 under the shape of an electrical signal. Such flight control calculator 4 then uses such pilot order to determine, thru usual internal control laws, the control order being efficiently applied to the vertical rudder 7.

The system 1 according to the invention is such that it allows, despite the absence of a mechanical rudder compensator, to meet the operational needs relative to such compensator.

To do so, said system 1 comprises in addition:
  auxiliary means (rudder trim compensation generator) 10 to generate a rudder trim compensation order under the form of an auxiliary electrical signal. Such rudder trim compensation order is also called bias RTS hereinunder; and
  means (electrical connections 11, 12) to transmit such auxiliary electrical signal to said flight control calculator 4.

Moreover, according to the invention, said flight control calculator 4 comprises means 13 to generate, thru both such auxiliary electrical signal and said electrical control signal, the control orders being transmitted to the operating means 6 for the vertical rudder 7.

Such control orders are consequently calculated from an overall order corresponding to the sum of the order relative to the position of the rudder bar 2 (electrical control signal) and the compensation order (auxiliary electrical signal) generated by said auxiliary means 10.

Thus, on the system 1 according to the invention, the necessary actions to meet the operational needs relative to a rudder compensator are not implemented by a usual mechanical compensator, that the system 1 has not, but by the generation and the application of a rudder compensation order which is transmitted (under the shape of an electrical signal) to the flight control calculator 4 which uses it to calculate the rudder control orders.

Within such system 1, the nil effort rudder bar position is thus always the neutral position of the rudder bar 2.

The cancelation on said rudder control system 1 of any usual mechanical compensator thus generates gains on the aircraft mass, cost, installation facility, maintenance operations and overall reliability.

In a first embodiment, said auxiliary means 10 comprise automatic means 15 which comprise;

usual means 16 to automatically detect a failure in an engine of the aircraft;

means 17 which are connected by a link 18 to said means 16 and which are formed so as to automatically determine an optimal sideslip angle; and means (not shown) which are preferably integrated into the calculator 4 to take such optimal sideslip angle into account.

To do so, such optimal sideslip angle is added to a sideslip being controlled (corresponding to the rudder bar order) and the so-obtained sum is then converted into a rudder control order, which allows (by taking such optimal sideslip angle into account) to compensate the yawing moment generated by the failure.

Preferably, but not exclusively, said auxiliary means 10 are integrated into the calculator 4.

This first embodiment applies then to cases of an engine failure. However, it could also be applied for an automatic compensation for an aircraft dissymmetry having another reason than an engine failure.

The means 17 use a developed normal side law, so-called Y* law. This usual law, which masters the sideslip of the aircraft at the above mentioned optimal sideslip angle, is able to automatically block the yawing moment generated by the failure.

With this first embodiment, in the case of an engine failure, the crew does not need anymore to provide a constant muscular effort on the vertical rudder 2 and a mechanical compensation function is not necessary anymore.

However, to take the situation of piloting laws being degraded (Y* law not available further to equipment failures for example) into account, said auxiliary means 10 also comprise hand operated means 19A, 19B to allow a pilot to control (that is to say to select hand operation) a compensation order being transmitted to the control means.

Such hand operated means 19A, 19B which are relative to a second embodiment of the invention, can be used instead of or in addition to automatic means 15 of said first embodiment.

Upon an engine failure, both embodiments can thus be used together or separately. In particular, upon a failure of the yawing moment automatic compensation (first embodiment), the pilot can use the second embodiment to perform a hand operated control.

In the case of an engine failure, the control by the pilot of a compensation order according to the invention (bias RTS) equal to the required rudder bar position enables to release the rudder bar 2 at the neutral position with no muscular effort.

Considering BTGT as the necessary order to compensate for an engine failure being detected, the situation shown in the following table are obtained in that case.

| | Position of rudder bar 2 | Bias RTS | Pilot order (law input) |
|---|---|---|---|
| Before engine failure | Neutral | Nil | Nil |
| After engine failure and blocking at the rudder bar 2 | BTGT | Nil | BTGT |
| After control of bias RTS | Neutral | BTGT | BTGT |

The second embodiment (compensation by hand control) can be used in any situation of the aircraft requiring dissymmetry compensation and especially in the case of an aircraft being twisted or asymmetrically loaded (fuel, passengers).

In those last cases, instead for the pilot to compensate for dissymmetry by an action to the rudder bar 2, he compensates it directly by an action on the control of the bias RTS value.

In such a way, dissymmetry is compensated while keeping the rudder bar 2 in the neutral position with no muscular effort.

Considering CDis as the necessary order to compensate for such dissymmetry, the situations shown in the following table are obtained in those cases.

| | Position of rudder bar 2 | Bias RTS | Pilot order (law input) |
|---|---|---|---|
| Before dissymmetry compensation | Neutral | Nil | Nil |
| After dissymmetry compensation | Neutral | CDis | CDis |

The hand operated means 19A, 19B of said second embodiment can be realized on different ways.

Thus, in a first embodiment variation represented on FIG. 2, said hand operated means 19A comprise:

a rotating button 20 which is adapted to be brought by hand by a pilot into three different position, namely:

an extreme position P1 for which the value of the compensation order (bias RTS) decreases progressively;

an extreme position P2 for which the value of the compensation order increases progressively; and a neutral position P0 for which the value of the compensation order is fixed to the value obtained after a right rotation or a left rotation of the button 20; and a re-initialization button 21 which resets the compensation order to a nil value when it is operated.

Such hand operated means 19A which can use the same types of buttons as the usual control means of a usual mechanical compensation, allow the value of the bias RTS to be controlled with efficiency and precision.

Considering that the value of the bias RTS varies from −100% (on the left side) to +100% (on the right side) and that it is 0% in the neutral position P0, the following logics are available:

when the pilot rocks the rotating button 20 to the left (position P1), the value of bias RTS decreases progressively while being limited to −100%;

when the pilot rocks the rotating button to the right (position P2), the value of bias RTS increases progressively while being limited to +100%; and when the pilot presses on the re-initialization button 21, the value of bias RTS comes back progressively to 0%.

Naturally, the value of bias RTS may vary between other values than −100% and +100% (with respect to the possible clearance of the rudder bar).

As an illustration, the following control speeds for the compensation order can be predicted.

|  | Slats and flaps in smooth configuration | Slats and flaps in non smoothed configuration |
|---|---|---|
| Handling of the rotating button 20 during less than 1.5 sec | 0.5 deg/sec | 1 deg/sec |
| Handling of the button 20 beyond 1.5 sec | 1.5 deg/sec | 3 deg/sec |

Furthermore, the reset speed for the compensation order (bias RTS) by a depression on the re-initialization button 21 can be 3°.

In this example, it is appropriate to consider a rudder bar clearance, from an abutment to the following, of +/−30°.

Figure 3:
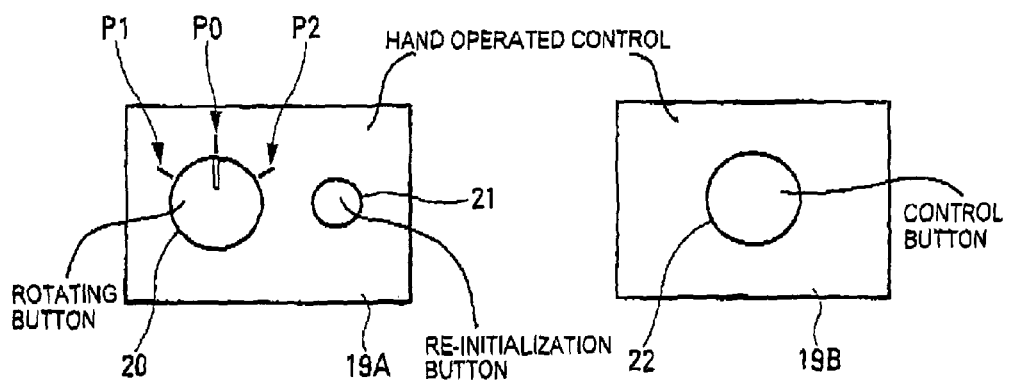

Furthermore, in a second preferred embodiment variation, represented on FIG. 3, said hand operated means 19B comprise a (unique) control button 22 which leads, when it is kept depressed and that simultaneously the rudder bar 2 which was previously depressed is released (progressively) to a (progressive) increase of the compensation order, such increase being proportional to the clearance variation (release) of the rudder bar 2. The compensation order being generated corresponds to the one obtained upon the release of said control button 22.

These hand operated means 19B enable the value of bias RTS to be controlled efficiently and precisely.

Preferably the value of bias RTS varies from −100% (on the left side) to +100% (on the right side) and it is 0% at the neutral position.

Operationally:
the pilot start to balance the aircraft by an action on the rudder bar 2 (non nil position and effort);
then he presses on the button 22 and keeps it depressed while releasing the rudder bar 2 progressively up to the neutral position (for a nil effort).

As the rudder bar 2 is repositioned toward the neutral position by the pilot, and that the button 22 is kept depressed:
the pilot order (at the low input) is fixed to the value it had at the moment where the crew depressed the button 22; and
the compensation according to the invention (bias RTS) increases progressively in proportion to the clearance variation of the rudder bar 2.

Once the rudder bar 2 is on the neutral position, the pilot releases the button 22 and the position of the rudder bar 2 takes action again in the composition of the pilot order (at the law input). The bias RTS being registered is then equivalent to the rudder bar position before the procedure.

Considering EqLat as the rudder control order wished by the pilot and IntLat as an intermediate position of the rudder bar 2, the situations shown on the following table are obtained upon the control above mentioned.

|  | Position of rudder bar 2 | Bias RTS | Pilot order (law input) |
|---|---|---|---|
| Rudder bar 2 deflected by the pilot before the start of the procedure | EqLat | Nil | EqLat |
| Progressive return of the rudder bar 2 on neutral position while keeping button 22 depressed | IntLat | EqLat-IntLat | Eqlat |
| Rudder bar 2 at neutral position with button 22 being released | Neutral | EqLat | EqLat |

The compensation value is then incremented as long as the button 2 is depressed. Such increment corresponds to the difference between the rudder bar position (EqLat) at the moment where the button is depressed and the current position (IntLat) of the rudder bar 2.

Once the control procedure being ended, the rudder bar 2 is re-established in the neutral position (with no muscular effort) while having a pilot order correctly compensated for. The aircraft is thus for a long time balanced with no muscular effort on the rudder bar 2.

It should be noticed that:
when the compensation value (bias RTS) reaches its limit (+/−100%), the increment is not taken into account anymore and everything occurs as if the pilot had released the button 22 (even it is not the case yet) and the position of the rudder bar 2 takes action again on the pilot order; and the compensation increment (bias RTS) takes only effect when the pedals are released. It is nil when the pedals 2A, 2B are further depressed with respect to the position they had at the moment where the button 22 has been depressed.

In this second embodiment variation, said hand operated means 19B can also comprise a re-initialization button (not represented) which is for example similar to the re-initialization button 21 to put the compensation order to a nil value when it is operated.

The invention also comprises a particular embodiment being applied to an aircraft provided with an automatic piloting system (not shown) which equilibrates usually the aircraft in yawing over a non nil rudder order.

In such particular embodiment, the system 1 comprises means 24 to initialize automatically (via a link 25) upon the disengagement of said automatic piloting system being previously engaged, the value of compensation to the value of the rudder bar order controlled by such automatic piloting system before the disengagement thereof.

As the rudder bar 2 is at the neutral position at the moment of the disengagement of the automatic piloting system, a continuity of the rudder control is obtained, entering the laws as illustrated on the following table, where OPA represents the automatic piloting system (at the moment of the disengagement thereof).

|  | Position of rudder bar 2 | Bias RTS | Order of the automatic piloting system | Rudder order (law input) |
|---|---|---|---|---|
| Before disengagement of automatic piloting system | neutral | / | OPA | OPA |
| After disengagement of automatic piloting system | Neutral | OPA | / | OPA |

In the field of the present invention, it can be authorized or not, on the system 1, to adjust by hand the bias RTS when the automatic piloting system is engaged (dissymmetry compensation). In a particular embodiment authorizing adjustment by hand, the order of the automatic piloting system is summed to the compensation controlled by hand to give the rudder control on the law input. In this case, a continuity of the disengagement order of the automatic piloting system is also ensured by a re-adjustment of the bias RTS value.

The invention claimed is:

1. A vertical rudder control system for an aircraft, comprising:
    a rudder bar configured for actuation by a pilot of said aircraft;
    rudder bar position detection unit configured for detecting rudder bar position and generating an electrical control signal corresponding to the rudder bar position;
    rudder trim compensation generator for generating a rudder trim compensation order setting a nil effort rudder bar position as a rudder bar neutral position, wherein the rudder bar compensation generator generates an auxiliary electrical signal based on the generated rudder trim compensation order, and the nil effort rudder bar position is the rudder bar position at which the rudder bar is controlled with nil muscular pilot effort;
    flight control calculator configured for calculating, from the auxiliary electrical signal and said electrical control signal, rudder control orders for the vertical rudder, wherein said rudder control orders are calculated, from a sum of the rudder bar position and the rudder trim compensation order, to maintain the nil effort rudder bar position as the neutral position of the rudder bar; and
    rudder operating unit configured to receive the control orders for the vertical rudder and deflect the vertical rudder by a deflection value based on the control orders.

2. The system according to claim 1,
    wherein said rudder trim compensation generator is configured for determining, upon a failure of an engine of the aircraft, a rudder trim compensation order enabling compensation for a yawing moment generated by the engine.

3. The system according to claim 2,
    wherein said rudder trim compensation generator comprises an engine failure detection unit for detecting engine failure.

4. The system according to claim 1,
    wherein said rudder trim compensation unit comprises a hand operated control allowing a pilot to control the rudder trim compensation order.

5. The system according to claim 4,
    wherein said hand operated control comprises:
        a rotating button configured to be brought by hand into three different positions:
            a first extreme position (P2) for which the value of the rudder trim compensation order increases progressively;
            a second extreme position (P1) for which the value of the rudder trim compensation order decreases progressively; and
            a neutral position (P0) for which the value of the rudder trim compensation order is fixed; and
        a re-initialization button configured for resetting the rudder trim compensation order to a nil value.

6. The system according to claim 4,
    wherein said hand operated control comprises a control button configured, upon depression and release of the control button, for increasing rudder trim compensation order in proportion to a clearance variation of the rudder bar.

7. The system according to claim 1,
    further comprising an initialization unit for providing an initialized rudder control order value, wherein the initialized rudder control order value is based on the rudder control orders carried out upon disengagement of an automatic piloting system.

8. An aircraft,
    comprising the vertical rudder control system of claim 1.

* * * * *